United States Patent [19]

Nishimatsu et al.

[11] Patent Number: 4,618,535
[45] Date of Patent: Oct. 21, 1986

[54] MAGNETIC RECORDING MEDIUM

[75] Inventors: Masaharu Nishimatsu, Komoro; Toshiaki Ide; Hiroyuki Arioka, both of Saku; Yuichi Kubota, Komoro, all of Japan

[73] Assignee: TDK Corporation, Tokyo, Japan

[21] Appl. No.: 642,208

[22] Filed: Aug. 20, 1984

[30] Foreign Application Priority Data

Sep. 12, 1983 [JP] Japan .................. 58-166677

[51] Int. Cl.$^4$ ............................. G11B 5/72
[52] U.S. Cl. ........................... 428/325; 360/134; 360/135; 360/136; 427/44; 427/131; 427/128; 428/323; 428/329; 428/330; 428/408; 428/425.9; 428/694; 428/522; 428/900
[58] Field of Search ........... 428/694, 695, 328, 403, 428/407, 405, 900, 408, 212, 329, 323, 330, 325, 425.9, 522; 427/132, 131, 44, 128; 360/134-136

[56] References Cited

U.S. PATENT DOCUMENTS

| | | | |
|---|---|---|---|
| 3,993,824 | 11/1976 | Shirahata | 427/130 |
| 4,328,935 | 5/1982 | Steel | 427/131 |
| 4,414,270 | 11/1983 | Miyoshi | 428/336 |
| 4,419,406 | 12/1983 | Isobe | 428/900 |
| 4,443,514 | 4/1984 | Yamamoto | 428/694 |
| 4,451,531 | 5/1984 | Isobe | 427/44 |
| 4,452,863 | 6/1984 | Takizawa | 427/128 |
| 4,474,843 | 10/1984 | Miyoshi | 427/131 |
| 4,486,500 | 12/1984 | Naruo | 427/44 |
| 4,547,419 | 10/1985 | Nishimatsu | 428/694 |

*Primary Examiner*—Ellis P. Robinson
*Attorney, Agent, or Firm*—Oblon, Fisher, Spivak, McClelland & Maier

[57] ABSTRACT

A magnetic recording medium comprising a plastic base film, a thin magnetic metal layer formed on one side of the base film and a backing layer formed on the other side of the base film, characterized in that the backing layer is composed essentially of a thermoset or radiation-cured resin and carbon black and inorganic compound powder uniformly dispersed in the resin, and has a surface roughness of from 0.05 to 0.4 $\mu$m, said carbon black having an average particle size of from 10 to 150 m$\mu$m as measured by an electron microscope, said inorganic compound powder having a Mohs hardness of at most 6 and a particle size of from 10 to 500 m$\mu$m, and the ratio of the carbon black to the inorganic compound powder being from 1:9 to 9:1.

6 Claims, No Drawings

MAGNETIC RECORDING MEDIUM

BACKGROUND OF THE INVENTION

1. Field of the Invention

The present invention relates to a magnetic recording medium. More particularly, the present invention relates to a magnetic recording medium and a process for its production, wherein a backing layer is formed on a thin film-type magnetic recording medium having a thin ferromagnetic metal (inclusive of alloy) layer formed on a substrate of e.g. polyester by electroplating, chemical plating, vapour deposition, sputtering, ion plating or the like, to reduce the frictional coefficient and to minimize the curling, whereby the dropout can be minimized.

2. Description of the Prior Art

Recently, magnetic tapes have been widely used in the fields of audio and video recording, computers, etc. The amount of information to be recorded on magnetic recording media increases year after year, and there is an increasing demand for recording media to have a high recording density.

A thin ferromagnetic metal layer formed by electroplating, chemical plating, vacuum deposition, sputtering or ion plating, is composed of 100% metal or alloy, and thus is capable of having a high recording density. However, when a thin ferromagnetic metal layer is formed by such a method, the surface condition of the substrate gives a substantial effect on the surface condition of the thin ferromagnetic layer.

In order to minimize the spacing loss with the magnetic head, the surface of the magnetic layer is desired to be as smooth as possible, and, at the same time, deposition of foreign matters should be avoided to minimize the dropout. In the case of a thin metal layer, the surface property is much improved over the magnetic layer composed of magnetic metal powder dispersed in a binder. However, since the surface roughness is as small as 0.01 μm (as a $R_{20}$ value, i.e. an average value of 20 measured values, at a cut off of 0.17 mm by the Tallistep method mentioned hereinafter), the contacting surface area is correspondingly large and the frictional coefficient is likewise large, whereby smooth running tends to be difficult. Besides, there is a trend that the thickness of the substrate such as a plastic base film made of e.g. polyethyleneterephthalate, polyethylenenaphthalate, polyimide or polyamide, becomes thinner. At present, a thickness of 11 μm or less is being studied. As the base film becomes thinner, the medium tends to be so flexible that the friction will increase, the winding up adhesion is likely to take place, and the adhesion to the guide rollers or support pins is likely to occur. Further, the thin magnetic metal layer tends to curl the medium.

Not only that, when the surface smoothness is so superior as mentioned above, even a very small spacing formed by deposition of very fine foreign matters, is likely to cause dropout.

SUMMARY OF THE INVENTION

Under the circumstances, it is an object of the present invention to overcome the drawbacks inherent to the conventional magnetic recording media wherein a thin magnetic metal layer is employed and to provide a backing layer which exhibits extremely effective functions.

The present inventors have found that the abrasion of the backing layer as well as the curling or adhesion of the magnetic recording medium can be reduced by forming the backing layer from a thermosetting composition comprising a vinyl chloride-vinyl acetate-vinyl alcohol copolymer, a polyurethane and a polyisocyanate, or a thermosetting composition comprising such components and nitrocellulose, or from a radiation sensitive resin composition such as a radiation curable resin containing acrylic, maleic or allyl-type double bonds.

Based on this discovery, it has further been found that when the backing layer is formed from the above-mentioned thermosetting or radiation curable composition, the surface roughness of the backing layer is extremely important because the surface roughness of the thin ferromagnetic metal layer is as small as 0.01 μm, and that the surface roughness of the backing layer should be within a range of from 0.05 to 0.4 μm for the improvements of the S/N ratio and the running property. If the surface roughness of the backing layer exceeds 0.4 μm, the ferromagnetic surface property can not effectively be used, whereby the S/N ratio decreases to a substantial extent. On the other hand, if the surface roughness is less than 0.05 μm, the friction of the backing layer surface tends to be too great, whereby the running characteristics tend to be inferior.

The backing layer is likely to be electrostatically charged by the friction with the guide rollers, whereby it tends to adsorb dusts which cause dropouts, the winding of the magnetic tape tends to be irregular, or the output tends to fluctuate. Such a drawback can be minimized by incorporating conductive particles such as carbon black into the backing layer. However, when carbon black is employed, it is likely to be scraped off by the contacting parts such as guide posts for recording or reproduction, or by a shear stress between the magnetic layer surface and the backing layer surface when the tape is wound, and thus cause dropouts. This is attributable to the brittleness of the carbon black.

The present invention is intended to provide a magnetic recording medium having a minimum problem of the above-mentioned nature, particularly a minimum abrasion of the magnetic and backing layers by incorporating into the backing layer, carbon black having an average particle size of from 10 to 150 mμm (as measured by an electron microscope - the same applies hereinafter) and an inorganic compound powder having a Mohs hardness of at most 6 and a particle size of from 10 to 500 mμm, such as $CaCO_3$, kaolin, $BaSO_4$ or $Fe_2O_3$. It has been found that in this manner, the problem of the brittleness of the carbon black can be solved. Under mild conditions, carbon black may be used alone without any particular problem. However, when used under high temperature and high humidity conditions (e.g. at 40° C. under a relative humidity of 80%), the soft inorganic compound powder complements the brittleness of the carbon black to reduce the abrasion. Furthermore, such an inorganic compound powder complements the poor dispersibility of the carbon black to improve the surface property and the electromagnetic characteristic of the backing layer.

Thus, the present invention provides a magnetic recording medium comprising a plastic base film, a thin magnetic metal layer formed on one side of the base film and a backing layer formed on the other side of the base film, characterized in that the backing layer is composed essentially of a thermoset or radiation-cured resin and carbon black and inorganic compound powder uniformly dispersed in the resin, and has a surface roughness of from 0.05 to 0.4 μm, said carbon black having an average particle size of from 10 to 150 m$\mu$m as measured by an electron microscope, said inorganic compound powder having a Mohs hardness of at most 6 and a particle size of from 10 to 500 m$\mu$m, and the ratio of the carbon black to the inorganic compound powder being from 1:9 to 9:1.

DETAILED DESCRIPTION OF THE INVENTION

In the present invention, the backing layer formed on the rear side of a thin base film such as a polyester base film, is generally classified into two types, i.e. one type being a thermosetting resin composition, and the other type being a radiation curable (or ionizable) resin composition which will be described hereinafter.

It has been found that as the thermosetting resin composition to be used for the backing layer, a thermosetting binder comprising a vinyl chloride-vinyl acetate-vinyl alcohol copolymer, a polyurethane prepolymer and a polyisocyanate or a thermosetting binder comprising such components and nitrocellulose, and containing carbon black and inorganic compound powder, exhibits an excellent thermosetting property. The radiation curable resin composition to be used for the backing layer is a resin binder composed essentially of a radiation sensitive resin having radiation curable double bonds such as acrylic, maleic or allyl-type double bonds, and containing carbon black and inorganic compound powder.

The carbon black to be used in the present invention, is selected from those having an average particle size of from 10 to 150 m$\mu$m. If the average particle size is less than 10 m$\mu$m, the carbon black tends to be locally concentrated, and the backing layer surface tends to be roughened and is likely to give adverse effects to the magnetic layer which is in contact therewith. Further, the electroconductivity tends to be poor, whereby a greater amount will be required. On the other hand, if the average particle size exceeds 150 m$\mu$m, the problem of the abrasion of the backing layer surface tends to be pronounced although the electroconductivity will be improved, and the abraded particles are likely to deposit on the magnetic layer surface, thus leading to dropouts. According to the present invention the problem of the brittleness of the carbon black can completely be overcome by using an inorganic compound powder having a Mohs hardness of at most 6. As a preferred inorganic compound, there may be mentioned a powder having a Mohs hardness of at most 6 such as $CaCO_3$, kaolin, $BaSO_4$ or $\alpha$-$Fe_2O_3$. The particle size of such a powder is usually from 10 to 500 m$\mu$m. The carbon black does not create any problem under a normal temperature. When combined with e.g. $CaCO_3$, it overcomes the problem of the abrasion of the backing layer even under high temperature and high humidity conditions (e.g. at 40° C. under a relative humidity of 80%), as mentioned above. Furthermore, it is thereby possible to solve the problem of the abrasion of the magnetic layer. The ratio of the carbon black to the inorganic compound powder is from 1:9 to 9:1 (weight ratio). Further, it has been found that good results are obtainable when they are used in an amount of from 20 to 80% relative to the total amount of the backing layer.

The thin magnetic metal layer is brittle as compared with the magnetic layer made of $\alpha$-$Fe_2O_3$ or Co-containing $\alpha$-$Fe_2O_3$. Accordingly, if an inorganic compound powder having a Mohs hardness exceeding 6 is employed for the backing layer, the magnetic layer surface tends to be susceptible to abrasion. Whereas, according to the present invention, this problem can be prevented by using an inorganic compound powder having a Mohs hardness of at most 6. Besides, this inorganic powder has a better dispersibility than the carbon black. Accordingly, by the incorporation of the inorganic compound powder, the surface roughness can be reduced, the transfer of the configuration to the magnetic layer surface can be avoided, and the electromagnetic characteristics can be improved. This is attributable to the fact that by using the material having a Mohs hardness of at most 6, a proper flexibility is obtained.

The proportions of the components of the binder for the backing layer, may be varied within wide ranges in the case of the thermosetting binder. However, in the case of a combination of a vinyl chloride-vinyl acetate-vinyl alcohol copolymer and a polyurethane, it is preferred to use from 10 to 80% by weight of the former and the rest being the latter and to add a polyisocyanate in an amount of from 5 to 80 parts by weight relative to 100 parts by weight of the total amount of the above resins.

In the case where nitrocellulose is added to the above binder composition, from 15 to 60% by weight of nitrocellulose, from 15 to 60% by weight of a vinyl chloride-vinyl acetate-vinyl alcohol copolymer and from 10 to 70% by weight of a polyurethane may be used to bring the total amounts to be 100% by weight. Then, a polyisocyanate is added in an amount of from 5 to 80 parts by weight relative to 100 parts by weight of the total amount of the above resins. The addition of nitrocellulose serves to further reduce the adhesion and to further improve the abrasion resistance.

In the case where a radiation curable binder is used for the backing layer of the present invention, the following resins may be used as resins containing radiation curable double bonds such as acrylic, maleic or allyl-type double bonds.

(I) Vinyl chloride type copolymers:

There may be mentioned a vinyl chloride-vinyl acetate-vinyl alcohol copolymer, a vinyl chloride-vinyl alcohol copolymer, a vinyl chloride-vinyl alcohol-vinyl propionate copolymer, a vinyl chloride-vinyl acetate-maleic acid copolymer, a vinyl chloride-vinyl acetate-OH-terminated side chain alkyl group copolymer, such as VROH, VYNC or VYEGX, manufactured by UCC (Union Carbide Corporation, U.S.A.), and a maleic acid modified VERR also manufactured by UCC.

These copolymers can be modified to radiation-sensitive resins by introducing into them acrylic double bonds, maleic double bonds or allyl-type double bonds by the process described later.

(II) Unsaturated polyester resins:

There may be mentioned saturated polyester resins obtained by the esterification of saturated polybasic acids such as phthalic acid, isophthalic acid, terephthalic acid, maleic acid, maleic acid derivatives, succinic acid, adipic acid or sebacic acid, with polyhydric alcohols such as ethylene glycol, diethylene glycol, glycerol, trimethylol propane, 1,2-propylene glycol, 1,3-butanediol, dipropylene glycol, 1,4-butanediol, 1,6-hexanediol, pentaerythritol, sorbitol, glycerin, neopentyl glycol or 1,4-cyclohexane dimethanol, and resins obtained by the modification of these polyester resins with e.g. $SO_3Na$ (e.g. Vylon 53S).

These resins can be modified to radiation-sensitive resins by the process mentioned hereinafter.

(III) Unsaturated polyester resins:

There may be mentioned polyester compounds containing radiation-curable unsaturated double bonds in the molecular chains, such as unsaturated polyester resins, prepolymers, and oligomers containing radiation curable unsaturated double bonds, which correspond to the saturated polyester resins prepared by the esterification of polybasic acids with polyhydric alcohols as referred to as the thermoplastic resins in the above (II) with the exception that a part of the polybasic acid has been replaced by maleic acid.

Examples of the polybasic acids and polyhydric alcohols for the saturated polyester resins include those compounds as enumerated in the above (I), and examples of the radiation-curable unsaturated double bonds include maleic acid, fumaric acid, and so forth.

The radiation-curable unsaturated polyester resin can be produced by adding maleic acid, fumaric acid, or the like to at least one polybasic acid component and at least one polyhydric alcohol component, and then subjecting the mixture to a dehydration or dealcoholization reaction in the conventional manner, i.e. at a temperature of from 180° to 200° C. in a nitrogen atmosphere in the presence of a catalyst, thereafter raising the temperature to a range of from 240° to 280° C. whereupon a condensation reaction is effected under a reduced pressure of from 0.5 to 1 mmHg, to obtain a polyester resin. The content of maleic acid, fumaric acid, or the like may be in a range of from 1 to 40 mol %, or preferably from 10 to 30 mol %, in the acid component in view of the degree of cross-linking at the time of its production, the radiation-curability, and so on.

(IV) Polyvinyl alcohol type resins:

There may be mentioned polyvinyl alcohol, butyral resins, acetal resins, formal resins, and copolymers of these components.

The hydroxyl groups contained in these resins can be modified to be radiation-sensitive by the process described hereinafter.

(V) Epoxy type resins and phenoxy resins:

There may be mentioned epoxy resins obtained by the reaction of bisphenol A with epichlorohydrin, methylepichlorohydrin or the like, such as EPIKOTE 152, 154, 828, 1001, 1004 and 1007 (manufactured by Shell Chemical Company); DEN431, DER732, DER511 and DER331 (manufactured by Dow Chemical Company); EPICLON-400 and EPICLON-800 (manufactured by Dai-Nippon Ink K.K.); phenoxy resins such as PKHA, PKHC and PKHH which are the highly polymerized resins among the above-mentioned epoxy resins, and are manufactured by Union Carbide Corporation; and copolymers of brominated bisphenol A with epichlorohydrin, such as EPICLON 145, 152, 153 and 1120 (manufactured by Dai-Nippon Ink & Chemicals Co.) and others.

The radiation-sensitive modification is effected by utilization of the epoxy groups contained in these resins.

(VI) Cellulose derivatives:

Cellulose derivatives of various molecular weights are also effective as thermoplastic components. Particularly effective and preferable among these cellulose derivatives are nitrocellulose, cellulose aceto-butylate, ethyl-cellulose, butyl-cellulose, acetyl-cellulose, and so forth.

These cellulose derivatives are modified to radiation-sensitive resins by activating the hydroxyl groups in the resins by the process mentioned hereinafter.

Besides the above, the resins which may also be used effectively for the radiation-sensitive modification are polyfunctional polyester resins, polyether ester resins, polyvinyl pyrrolidone resins and derivatives thereof (e.g., PVP olefin copolymers), polyamide resins, polyimide resins, phenol resins, spiro-acetal resins, acrylic resins containing therein at least one acrylic or methacrylic acid ester having a hydroxyl group as the polymerization component, and the like.

Further, by blending a thermoplastic elastomer or prepolymer with the above-described radiation-sensitive, modified thermoplastic resin, it is possible to make the coating film much more tenacious. Furthermore, when such an elastomer or prepolymer is likewise modified to be radiation-sensitive, a better result can be obtained, as will be described hereinbelow.

In the following, there will be given examples of the elastomers and prepolymers which may be combined with the above-described radiation-sensitive resins.

(I) Polyurethane elastomers, prepolymers and telomers:

The use of polyurethane elastomers is particularly effective in that their abrasion resistance and adhesion to EPT films are satisfactory.

Examples of such effective urethane compounds are: polyurethane elastomers, prepolymers, and telomers which are composed of polycondensates of various polyhydric isocyanates, as the isocyanate components, such as 2,4-toluene diisocyanate, 2,6-toluene diisocyanate, 1,3-xylene diisocyanate, 1,4-xylene diisocyanate, 1,5-naphthalene diisocyanate, m-phenylene diisocyanate, p-phenylene diisocyanate, 3,3'-dimethyl-4,4'-diphenylmethane diisocyanate, 4,4'-diphenylmethane diisocyanate, 3,3'-dimethylbiphenylene diisocyanate, 4,4'-biphenylene diisocyanate, hexamethylene diisocyanate, isophorone diisocyanate, dicyclohexylmethane diisocyanate, Desmodule L, Desmodule N, and so on; and various polyesters such as linear saturated polyesters (e.g. those obtained by polycondensation of polyhydric alcohols such as ethylene glycol, diethylene glycol, glycerin, trimethylolpropane, 1,4-butanediol, 1,6-hexanediol, pentaerythritol, sorbitol, neopentyl glycol, 1,4-cyclohexane dimethanol, and so forth with saturated polybasic acids such as phthalic acid, isophthalic acid, terephthalic acid, maleic acid, succinic acid, adipic acid, sebasic acid, and so forth), linear saturated polyethers (e.g. polyethylene glycol, polypropylene glycol, polytetraethylene glycol, and so forth) as well as caprolactum, hydroxyl-containing acrylic acid esters, hydroxyl-containing methacrylic acid esters, and so forth.

While these elastomers may be combined, as they are, with various radiation-sensitive thermoplastic resins, it will be highly effective to further react these elastomers with a monomer having an acrylic double bond, an allyl-type double bond, or the like which reacts with the terminal isocyanate group or hydroxyl group in the urethane elastomer, to thereby modify the resins to be radiation-sensitive.

(II) Elastomers of acrylonitrile-butandiene copolymers:

Prepolymers of acrylonitrile-butandiene copolymers containing therein terminal hydroxyl groups, such as "poly BD Liquid Resin" produced by Sinclair Petrochemicals Corp. and available in general market, or elastomers such as "Hycar 1432J" manufactured by Japanese Zeon K.K., and so forth are particularly suitable as the elastomeric components, with which the double bonds in butadiene produce radicals by the radiation rays to cause cross-linking and polymerization.

(III) Polybutadiene elastomers:

Low molecular weight prepolymers having the terminal hydroxyl groups, such as "Poly BD Liquid Resin R-15", manufactured by Sinclair Petrochemicals Corp., are particularly suitable in respect of their compatibility with thermoplastic resins. In the "R-15" prepolymer, since the terminal end of the molecule is occupied by the hydroxyl group, it is possible to enhance the radiation sensitivity by adding an acrylic unsaturated double bond to the terminal end of the molecule, whereby the prepolymer becomes much more advantageous as the binder.

Further, cyclized products of polybutadiene such as "CBR-M901" manufactured by Japan Synthetic Rubber Co., also exhibit excellent performance by their combination with the thermoplastic resins. In particular, cyclized polybutadienes are highly efficient in their cross-linking and polymerization by radiation because of the radicals of the unsaturated bonds inherent to polybutadiene. Thus, they have excellent properties as the binder.

Further, suitable among other thermoplastic elastomers and their prepolymers are: styrene-butadiene rubbers, chlorinated rubbers, acrylic rubbers, isoprene rubbers and their cyclized products (e.g. "CIR701", manufactured by Japan Synthetic Rubber K.K.), and elastomers such as epoxy-modified rubbers, or internally plasticized saturated linear polyesters (e.g. "Vylon #300", a product of Toyo Spinning K.K.). These may also be used effectively by subjecting them to the modifying treatment for the radiation-sensitization described hereinbelow.

In addition to such elastomers, there may be added a vinyl chloride-vinyl chloride copolymer, an epoxy resin, a phenoxy resin or cellulose.

Now, examples for the syntheses of the radiation-sensitive binders will be given.

Production of tolylene diisocyanate adduct (a) Synthesis of an acryl-modified product of a vinyl chloride-vinyl acetate copolymer type resin (radiation-sensitive modified resin):

750 Parts by weight of Vinylite VAGH, 1250 parts by weight of toluene, and 500 parts by weight of cyclohexanone were charged into a four-necked flask of a 5-liter capacity and dissolved under heating. After raising the temperature to 80° C., 61.4 parts by weight of 2-hydroxyethyl methacrylate adduct of tolylene diisocyanate was added. Further, 0.012 part by weight of tin octylate and 0.012 part by weight of hydroquinone were added, and the reaction was carried out at a temperature of 80° C. in a nitrogen ($N_2$) stream until the conversion of NCO reached 90%. After completion of the reaction, the reaction system was cooled and diluted by addition of 1250 parts by weight of methyl ethyl ketone.

Production of 2-hydroxyethyl methacrylate (2HEMA) adduct of tolylene diisocyanate (TDI)

348 Parts by weight of tolylene diisocyanate was heated to a temperature of 80° C. in a four-necked flask of one-liter capacity in a nitrogen ($N_2$) stream. Thereafter, 260 parts by weight of 2-hexamethylene methacrylate, 0.07 part by weight of tin octylate, and 0.05 part by weight of hydroquinone were added dropwise into a reaction vessel, while cooling to control the temperature inside the reaction vessel to be in a range of from 80° to 85° C. After completion of the dropwise addition, the mixture was stirred for three hours at 80° C. to complete the reaction. After completion of the reaction, the reaction product was taken out of the reaction vessel and cooled to obtain 2-hydroxyethyl methacrylate (2HEMA) adduct of tolylene diisocyanate (TDI) as a white paste.

(b) Synthesis of an acryl-modified product of a butyral resin (radiation-sensitive modified resin)

100 Parts by weight of a butyral resin, "BM-S" produced by Sekisui Chemical Co., was charged into a four-necked flask of a 5-liter capacity, together with 91.2 parts by weight of toluene and 71.4 parts by weight of cyclohexanone, and dissolved under heating. After raising the temperature to 80° C., 7.4 parts by weight of the 2-hydroxyethyl methacrylate adduct of tolylene diisocyanate was added to the solution, followed by further addition of 0.015 part by weight of tin octylate and 0.015 part by weight of hydroquinone. Then, the reaction was carried out at 80° C. in a nitrogen ($N_2$) stream until the conversion of NCO reached at least 90%. After completion of the reaction, the reaction product was cooled and diluted with methyl ethyl ketone.

(c) Synthesis of an acryl-modified product of a saturated polyester resin (radiation-sensitive modified resin)

100 Parts by weight of "Vylon RV-200" manufactured by Toyo Spinning Co., was dissolved under heating in 116 parts by weight of toluene and 116 parts by weight of methyl ethyl ketone. After raising the temperature to 80° C., 3.55 parts by weight of the 2HEMA adduct of TDI was added, followed by further addition of 0.007 part by weight of tin octylate and 0.007 part by weight of hydroquinone. Then, the reaction was carried out at 80° C. in a nitrogen ($N_2$) stream until the conversion of NCO reached at least 90%.

(d) Synthesis of an acryl-modified product of an epoxy resin (radiation-sensitive modified resin)

400 Parts by weight of "Epikote 1007" manufactured by Shell Chemical Co., was dissolved under heating in 50 parts by weight of toluene and 50 parts by weight of methyl ethyl ketone. Thereafter, 0.006 part by weight of N,N-dimethylbenzylamine and 0.003 part by weight of hydroquinone were added to the solution, and the temperature was raised to 80° C. Then, 69 parts by weight of acrylic acid was added dropwise, and the reaction was carried out at 80° C. until the acid value became 5 or lower.

(e) Synthesis of an acryl-modified product of a urethane elastomer (radiation-sensitive elastomer)

250 Parts by weight of an isocyanate-terminated diphenylmethane diisocyanate (MDI) type urethane prepolymer, "Nipporan 4040", manufactured by Nippon Polyurethane Industry Co., 32.5 parts by weight of 2HEMA, 0.07 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the reaction vessel to be in a range of from 80° to 90° C. After completion of the dropwise addition, the reaction was conducted at 80° C. until the conversion of NCO reached at least 95%.

(f) Synthesis of an acryl-modified product of a polyether type terminal urethane-modified elastomer (radiation-sensitive elastomer)

250 Parts by weight of a polyether, "PTG-500" manufactured by Nippon Polyurethane Industry, 32.5 parts by weight of 2HEMA, 0.007 part by weight of hydroquinone, and 0.009 part by weight of tin octylate were charged into a reaction vessel, and dissolved under heating at 80° C. Then, 43.5 parts by weight of TDI was added dropwise into the reaction vessel, while cooling to control the temperature inside of the raction vessel to be in a range of from 80° to 90° C. After completion of the dropwise addition, the reaction was conducted at 80° C. until the conversion of NCO reached at least 95%.

(g) Synthesis of an acryl-modified product of a polybutadiene elastomer (radiation-sensitive elastomer)

250 Parts by weight of a low molecular weight hydroxyl-terminated polybutadiene, "Poly-BD-Liquid Resin R-15" manufactured by Sinclair Petrochemicals, Inc., 32.5 parts by weight of 2HEMA, 0.007 part by weight of hydroquinone, 0.009 part by weight of tin octylate were charged into a reaction vessel, and dissolved under heating at 80° C. Then, 43.5 parts by weight of TDI was added dropwise, while cooling to control the temperature inside of the reaction vessel to be in a range of from 80° to 90° C. After completion of the dropwise addition, the reaction was conducted at 80° C. until the conversion of NCO reached at least 95%.

Among high-polymer substances, there have been known those which undergo decomposition when irradiated with radiation rays and those which undergo cross-linking among the molecules by the irradiation with radiation rays. Those which undergo cross-linking among the molecules include polyethylene, polypropylene, polystyrene, polyacrylic acid ester, polyacrylamide, polyvinyl chloride, polyester, polyvinyl pyrrolidone rubbers, polyvinyl alcohol and polyacrolein. Such cross-linking type polymers can be used as radiation curable coating resins for the backing layer, as they are, i.e. without subjecting them to any particular modifying treatment as mentioned above, since they undergo a cross-linking reaction without such treatment.

Furthermore, according to this method, even a non-solvent type resin can effectively used for the back coating, since it can be cured in a short period of time without requiring any solvent.

As the active energy rays to be used for cross-linking of the backing layer of the present invention, there may be employed electron beams generated from a radiation accelerator as the source of radiation, γ-rays generated from $Co^{60}$ as the source of radiation, β-rays generated from $Sr^{90}$ as the source of radiation, or X-rays generated from an X-ray generator as the source of radiation.

From the viewpoints of the easy control of the absorption dose, the introduction to the production line, or the shielding of ionized radiation, it is particularly advantageous to use the radiation rays from the radiation accelerator as the source of radiation.

With respect to the characteristics of the radiation rays to be used for the curing of the backing layer, it is preferred, from the aspect of the penetrating power, to irradiate by means of the radiation accelerator having an acceleration voltage of from 100 to 750 KV, or preferably from 150 to 300 KV, at an absorption dose in a range of from 0.5 to 20 Mrad.

For the curing of the backing layer according to the present invention, a low dose type radiation accelerator (an electron-curtain system) manufactured by Energy Science Co., U.S.A. is extremely advantageous from the viewpoints of its easy introduction into the tape coating process line and the shielding of the secondary X-rays within the accelerator.

Needless to say, it is possible to use a Van de Graaff type accelerator which has so far been used widely as the radiation accelerating apparatus.

Further, for the cross-linking by radiation, it is important to irradiate the backing layer with the radiation rays in an inert gas stream such as nitrogen ($N_2$) gas, helium (He) gas, and so forth. It is extremely disadvantageous to conduct the radiation in the air because $O_3$, etc. generated by the radiation for the cross-linking of the binder components serve to prevent the radicals generated in the polymer from acting advantageously for the cross-linking reaction.

It is therefore important to maintain the atmosphere at a portion where the active energy rays are irradiated to be an inert gas atmosphere such as $N_2$, He or $CO_2$, with the oxygen concentration being as low as 1% at the maximum.

The binder component may further contain, as a part thereof, a radiation curable monomer such as acrylic acid, methacrylic acid, acrylamide or methacrylamide.

In order to improve the abrasion resistance, the adhesion and the flexibility, the radiation curable resin may be combined with a polyurethane elastomer, a polyurethane prepolymer, an acrylonitrile-butadiene copolymer elastomer, a polybutadiene elastomer, an epoxy resin, a phenoxy resin, a cellulose or a vinyl chloride-vinyl acetate copolymer.

When the backing layer is made of a radiation curable binder, it will be more uniform and tougher than the backing layer formed from a thermosetting binder.

The presence of the backing layer tends to increase jitter. The "jitter" is a phenomenon for a fine phase modulation around the recording frequency. This phenomenon is believed to be connected with the smoothness of the tape running. Such jitter can be solved by incorporating a very small amount of a lubricant of a fatty acid or fatty acid ester type. Such an acid or ester is preferably the one having from 10 to 22 carbon atoms, such as lauric acid, stearic acid, myristic acid, or a mixture thereof. Adequate effect is obtainable when it is used in an amount of at most 3% by weight of the total weight of the backing layer.

Now, the present invention will be described in detail with reference to Examples. In the following Examples, the magnetic layer was formed by a vacuum vapour deposition, in which an alloy magnetic layer comprising 80% by weight of cobalt and 20% by weight of nickel, was vapour deposited on the surface of a polyethylene terephthalate film in a thickness of about 1500 Å by oblique vapour deposition. The surface roughness was about 0.01 μm.

EXAMPLE 1

A mixture having the following composition was mixed for a backing layer.

|  | Parts by weight |
|---|---|
| Vinyl chloride-vinyl acetate-vinyl alcohol copolymer (VAGH manufactured by Union Carbide Co.) | 30 |
| Polyurethane prepolymer (Desmocol 22) | 20 |
| Carbon black particle size 80 mμm) | 25 |
| $CaCO_3$ (particle size 40 mμm) | 25 |
| Methyl ethyl ketone | 200 |

To this mixture, 30 parts by weight of a polyisocyanate (Desmodule L) was added and mixed. The mixture was coated on the above-mentioned polyester film having the magnetic layer, in a thickness of 1.5 μm, dried, subjected to calender treatment and then thermoset. The film thereby obtained was cut into a video tape.

The surface roughness of the backing layer was varied within the range of from 0.05 to 0.4 μm by adjusting the calender treatment to various levels.

EXAMPLE 2

A video tape was prepared in the same manner and under the same conditions as in Example 1 except that the composition of the backing layer was changed as follows:

|  | Parts by weight |
|---|---|
| Nitrocellulose (Nitrocellulose manufactured by Dicel Ltd.) | 30 |
| Vinyl chloride-vinyl acetate-vinyl alcohol copolymer (VAGH manufactured by Union Carbide Co.) | 20 |
| Carbon black (particle size 100 mμm) | 30 |
| Polyurethane prepolymer (Desmocol 22) | 50 |
| $BaSO_4$ (particle size 80 mμm) | 20 |

EXAMPLE 3

|  | Parts by weight |
|---|---|
| Carbon black (20 mμm) | 20 |
| Acryl-modified vinyl chloride-vinyl acetate-vinyl alcohol copolymer a | 30 |
| Kaolin (Particle size 500 mμm) | 25 |
| Acryl-modified polyurethane elastomer e | 20 |
| Solvent mixture (MIBK/toluene = 1/1) | 300 |

EXAMPLE 4

|  | Parts by weight |
|---|---|
| Carbon black (particle size 20 mμm) | 25 |
| $CaCO_3$ (Particle size 100 mμm) | 25 |
| Acryl-modified polyester resin c | 60 |
| Solvent mixture | 300 |

The above mixture was processed in the same manner as in Example 3 to obtain a sample tape.

EXAMPLE 5

|  | Parts by weight |
|---|---|
| Carbon black (particle size 60 mμm) | 20 |
| Kaolin (Particle size 80 mμm) | 20 |
| $CaCO_3$ (Particle size 100 mμm) | 20 |
| Acryl-modified polyester elastomer e | 30 |
| Vinyl chloride-vinyl acetate-vinyl alcohol copolymer (VAGH manufactured by Union Carbide Co.) | 70 |
| Solvent mixture | 300 |

The above mixture was processed in the same manner as in Example 3 to obtain a sample tape.

COMPARATIVE EXAMPLES 1, 2 and 3

In Example 1, $CaCO_3$ was replaced by the same amount of carbon black (Comparative Example 1). Likewise, in Example 1, carbon black was replaced by the same amount of $CaCO_3$ (Comparative Example 2). Further, in Example 1, the carbon black and $CaCO_3$ were replaced by the same amounts of $Al_2O_3$ powder (600 mμm) (Comparative Example 3). The results thereby obtained are shown in Table 1.

TABLE 1

|  | Y-S/N (dB) | Frictional coefficient | | Cinching | Dropout | | Abrasion of the magnetic layer | Abrasion of the backing layer | Electric resistance (Ω/cm²) | Surface roughness |
|---|---|---|---|---|---|---|---|---|---|---|
|  |  | 1 run | 100 runs |  | 1 run | 100 runs |  |  |  |  |
| Example 1 | +1.0 | 0.30 | 0.33 |  | 50 | 100 |  |  | 2 × 10⁹ | 0.15 |
| Example 2 | +0.9 | 0.31 | 0.34 |  | 60 | 100 |  |  | 3 × 10⁹ | 0.12 |
| Example 3 | +0.5 | 0.29 | 0.32 |  | 50 | 80 |  |  | 4 × 10¹⁰ | 0.28 |
| Example 4 | +0.6 | 0.28 | 0.31 |  | 55 | 80 |  |  | 1 × 10⁹ | 0.25 |
| Example 5 | +0.6 | 0.29 | 0.32 |  | 50 | 75 |  |  | 1 × 10¹⁰ | 0.30 |
| Comparative Example 1 | +0.6 | 0.30 | 0.34 | Δ | 50 | 95 |  | X | 2 × 10⁸ | 0.32 |
| Comparative Example 2 | +1.0 | 0.31 | 0.35 |  | 250 | 350 |  |  | 2 × 10¹³ | 0.20 |
| Comparative Example 3 | 0 | 0.31 | 0.55 | X | 255 | 1500 | X | X | 3 × 10¹³ | 0.50 |

Note:
Y-S/N is a relative value based on the value of Comparative Example 3 being set to be 0dB.
 Excellent,
 Good,
X No good The mixture having the above composition was dispersed in a ball mill for five hours, and the dispersed mixture was coated on the rear surface of the polyester film, on which a magnetic layer had already been formed, in such a manner that the thickness of the backing layer upon drying would be 1.5 μm. Then, this backing layer was irradiated with and cured by electron beams in a nitrogen ($N_2$) gas by means of an electron curtain type electron beam accelerator at an accelerating voltage of 150 KeV, at an electrode current of 10 mA, and at an absorption dose of 5 Mrad. Then, the coated film was calendered and wound up on a reel, and cut into a video-tape with a width of ½ inch.

By the running test under a high temperature and high humidity condition at 40° C. under a relative humidity of 80%, the difference attributable to the type of the filler, which was not evident by a running test under normal conditions, was made clear. Namely, when subjected to the running test at 40° C. under a relative humidity of 80%, the product of Comparative Example 1 showed abrasion of the backing layer since carbon black was used and the coated layer was brittle. Further, the electric resistance was low, and the thin ferromagnetic layer also had a low electric resistance, whereby the tape winding is hardly tightened. Since the both layers had low electric resistance, they were slippery in the winding, whereby the winding became unstable, and a winding irregularity (cinching) was observed.

As in Comparative Examples 2 and 3, $CaCO_3$ and $Al_2O_3$ have high electric resistance, and thus are likely to lead to dropouts. Since the thin ferromagnetic layer has a low electric resistance, no cinching is observed even when the electric resistance of the backing layer is high. $CaCO_3$ has a hardness of less than 6, it does not give an adverse effect to the thin ferromagnetic layer surface. Whereas, $Al_2O_3$ has a high hardness, and it gives an influence over the magnetic layer surface, whereby the abrasion of the magnetic layer is observed.

The magnetic recording medium obtained in Example 1 was cut into a tape having a width of a video tape. The tape was driven at a speed of 3.8 m/sec by a video recorder, and the recording and reproduction were conducted at a major frequency of 5 MHz, whereupon the S/N ratio was obtained. When the surface roughness of the backing layer exceeds 0.4 μm, the output decreases considerably, and the S/N ratio decreases by at least 1 dB. On the other hand, when the surface roughnesses is less than 0.05 μm, the friction of the backing layer tends to be great, whereby smooth running becomes difficult.

The various characteristics were measured or evaluated as follows:

Frictional coefficient

The frictional coefficient was measured before and after the repeated running of 100 times (100 runs) at 40° C. under a relative humidity of 80% by means of a VHS system VTR.

The tape was put around a polished aluminum cylinder having a diameter of 4 mm at an angle of 180° so that the backing layer is located inside, and permitted to run at a speed of 2 cm/sec, whereby the tensions at the dispensing side and at the winding-up side were measured, and the frictional coefficient was obtained by calculation from the measured values.

Cinching phenomenon

By means of a commercially available VHS system VTR, a tape was permitted to run 100 times at 40° C. under a relative humidity of 80%, and then the winding of the tape was visually examined. Good winding where no space was observed in the tape winding, was designated by "good", and inferior winding where a space was observed in the tape winding, was designated by "no good". Abrasion of the backing layer and the magnetic layer:

By means of a commercially available VHS system VTR, a tape was permitted to run 100 times at 40° C. under a relative humidity of 80%, whereupon the abrasion was examined.

Electromagnetic characteristics (1) The S/N ratio (relative value) was shown as recorded and reproduced at a major frequency of 5 MHz. VTR of VHS was modified so that it was capable of measuring upto 5 MHz.

(2) The dropouts were measured at 15 μS and represented by the number/min.

Electron microscopic method (1) The average particle size was measured by a transmission electron microscope by selecting a sample from each tape.

(2) By means of a scanning type electron micoscope, a cross section was photographed. In this case, it was likely that particles were coagulated. In the case where particle size varied substantially, the minimum particle size was taken as the average particle size.

Surface roughness

The surface roughness was obtained by 20 point average method ($R_{20}$) from the chart obtained by means of Tallistep (manufactured by Taylor-Hobson Co.). A cut off of 0.17 mm, a needle pressure of 2 mg and a needle of $0.1 \times 2.5$ μm were employed.

What is claimed is:

1. A magnetic recording medium comprising a plastic base film, a thin magnetic metal layer formed on one side of the base film and a backing layer formed on the other side of the base film, characterized in that the backing layer is composed essentially of a thermoset or radiation-cured resin and carbon black and inorganic compound powder uniformly dispersed in the resin, and has a surface roughness of from 0.05 to 0.4 μm, said carbon black having an average particle size of from 10 to 150 mμm as measured by an electron microscope, said inorganic compound powder having a Mohs hardness of at most 6 and a particle size of from 10 to 500 mμm, and the weight ratio of the carbon black to the inorganic compound powder being from 1:9 to 9:1.

2. The magnetic recording medium according to claim 1, wherein the thermoset resin is made of a thermosetting binder comprising a vinyl chloride-vinyl acetate-vinyl alcohol copolymer, a polyurethane prepolymer and a polyisocyanate.

3. The magnetic recording medium according to claim 2, wherein the thermosetting binder further contains nitrocellulose.

4. The magnetic recording medium according to claim 1, wherein the radiation-cured resin is made of a radiation curable binder composed essentially of a radiation sensitive resin.

5. The magnetic recording medium according to claim 4, wherein the radiation sensitive resin has radiation curable acrylic, maleic or allyl-type double bonds.

6. The magnetic recording medium according to claim 1, wherein the inorganic compound powder is selected from the group consisting of $CaCO_3$, kaolin, $BaSO_4$ and $Fe_2O_3$.

* * * * *